May 18, 1943. W. J. HALL 2,319,678
MOLDING RETAINER
Filed Oct. 27, 1941
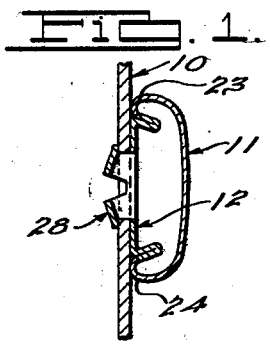
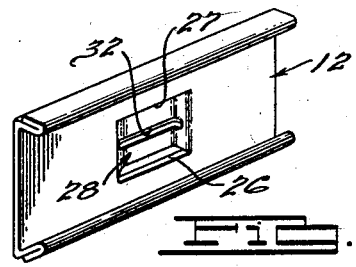
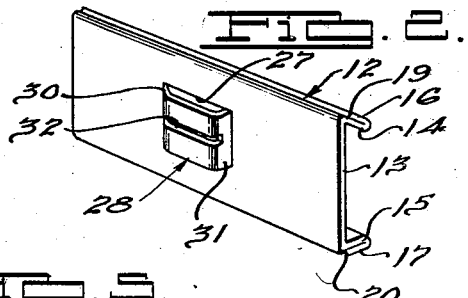
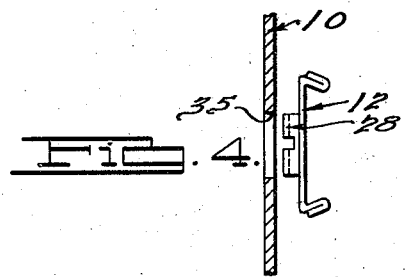
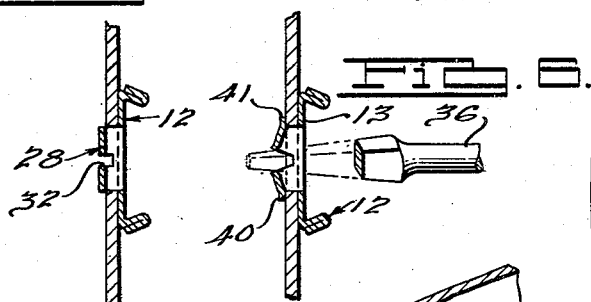
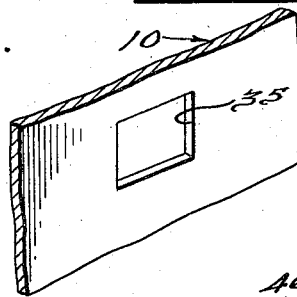
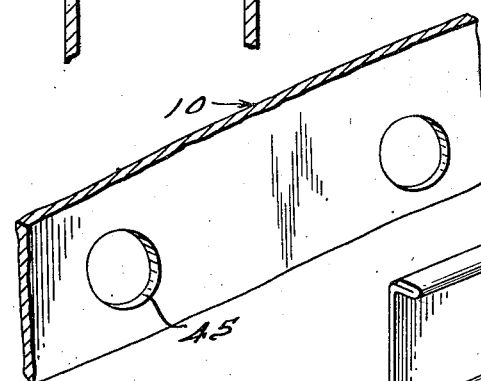
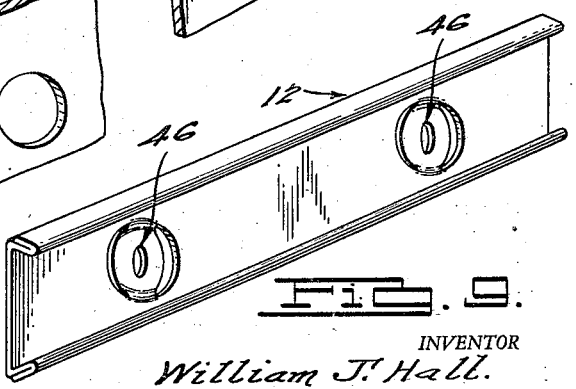
INVENTOR
William J. Hall.
BY Harness, Dickey & Pierce
ATTORNEYS Patented May 18, 1943

2,319,678

UNITED STATES PATENT OFFICE 2,319,678

MOLDING RETAINER

William J. Hall, Detroit, Mich., assignor of one-half to Orley J. Crowe, Detroit, Mich.

Application October 27, 1941, Serial No. 416,663

7 Claims. (Cl. 85—5)

The invention relates generally to molding and it has particular relation to means for attaching molding to a supporting panel or the like.

One object of the invention is to provide an improved attaching element for attaching molding to a supporting panel, which can be made inexpensively from sheet metal by means of ordinary stamping operations.

Another object of the invention is to provide an improved attaching element which can be applied easily to a supporting panel by means of a pointed or thin edge tool.

Another object of the invention is to provide an improved attaching element such as indicated which may be drawn tightly against the supporting panel during fastening of the element to the latter.

Other objects of the invention will become apparent from the following specification, from the drawing relating thereto, and from the claims hereinafter set forth.

For a better understanding of the invention, reference may be had to the drawing wherein:

Figure 1 is a cross-sectional view of a supporting panel and molding attached thereto, which shows in particular an attaching element constructed according to one form of the invention;

Figs. 2 and 3 are enlarged detail views illustrating the attaching element shown by Fig. 1;

Figs. 4, 5, and 6 are detail views illustrating steps in the operation of fastening the attaching element to the supporting panel;

Fig. 7 illustrates the particular type of opening in the panel previously shown; and Figs. 8 and 9 respectively show a panel having a plurality of circular openings and an elongated attaching element having a plurality of projections more particularly adapted for use with circular openings in the panel.

Referring to Fig. 1, a supporting panel is indicated at 10, a strip of molding is indicated at 11, and an attaching element is indicated at 12. The attaching element, as shown best by Figs. 2 and 3, comprises a base plate 13 having side flanges 14 and 15 converging outwardly towards each other and which terminate in reversely turned outer walls 16 and 17. Such outer walls terminate in spaced relation to the opposite surface of the base plate 13 and thus provide shoulders 19 and 20.

Again referring to Fig. 1, the molding 11 has inturned side edges 23 and 24 which engage under the shoulders 19 and 20 and by this means the molding is held on the attaching element with its edges in contact with the supporting panel 10. It might be added here that the molding is applied in a snap action manner by pressing the edges downwardly over the inclined walls 16 and 17 of the element 12 under the edges of the molding snap into engagement with the shoulders 19 and 20.

For fastening the attaching element to the panel 10, the base plate 13 is first provided with longitudinally extending, substantially parallel, and spaced slits 26 and 27 and the metal laterally between these slits is pressed outwardly at that side of the base plate opposite the flanges 14 and 15. In pressing the metal outwardly between the slits, suitable punch and die equipment is used so as to form a projection which has a substantially flat portion 28 approximately parallel with the base plate 13, and inclined end walls 30 and 31 which connect the portion 28 with the base plate 13. Intermediate the slits 26 and 27 the projection is formed with an opening or aperture such as a slot 32 which extends lengthwise through the portion 28 of the projection and partially through the end wall portions 30 and 31. While this slot might be extended entirely through the end wall portions 30 and 31, so that it will be the same length as the entire projection, it has been found preferable to terminate the slot in the manner shown and previously described so as to increase the strength of the projection at the ends thereof. Further mention of this will be made presently.

Now referring to Figs. 4, 5, and 6, the panel 10 is provided with an opening or openings 35 adapted to receive the projections 28 and the size of the opening is such as to permit ready insertion of the projection, although it is desirable to have only a small amount of play or clearance between the opposite side edges of the projection and the side edges of the opening.

After the attaching element is moved against the panel 10 with the projection 28 disposed in the opening 35, as shown by Figs. 5 and 6, a suitable tool, indicated at 36, is employed for spreading the side parts of the projection in a lateral direction. For instance, this new tool may be a screw driver having a sharp edge or it may be a tapering, pointed tool. In either case, the smaller end of the tool is pressed through the slot 32 and then by turning the tool or forcing it farther through the slot, the side portions of the projection are moved laterally apart until their opposite edges engage under the panel as indicated at 40 and 41. A greater overlapping of the side edges of the projection with the edges of panel will occur centrally of the projection since greater spreading will occur at the center of the projection. Ordinarily, the depth of the projection will correspond approximately with the thickness of the panel but it should be noted that in spreading the side parts of the projection, the tendency will be to draw the projection tightly against the panel and to have a clamping engagement between the side parts of the projection and the panel. It might be observed in this connection that in expanding the projection, the central part thereof will expand under the edges of the panel at the opening and the degree of overlapping will gradually diminish to a point in the region of the end wall portions 30 and 31 depending upon the degree of expanding obtained. Sufficient expansion of the parts will tend to move the end wall portions also into overlapping engagement with the panel and since these end wall portions taper towards the base plate 13, forces tending to spread them into engagement with the bottom surface of the panel will draw the base plate 13 against the panel. Perhaps, in other words, it may be said that the expansion of the parts of the projection will cause the panel to be gripped between the base plate 13 and the side edge surface of the projection and that the expansion of such parts may be continued until a very tight connection is obtained. Furthermore, the spreading of the two side portions of the projection will nturally cause the remote side edges thereof to draw more closely against the panel, or, in other words, when such portions are spread apart, the remote side edges tend to shift towards the base plate 13. Altogether then, it should be understood that spreading of the side portions of the projection moves them into overlapping engagement with the panel surface and at the same time clamps the panel between such portions and the base plate 13. Hence, the attaching element is firmly fastened to the supporting panel.

Fig. 7 shows a panel wherein the opening 35 is rectangular and approximating in dimensions to those of the projection 28. Thus, in this case, the attaching element is not only fastened securely to the panel against removal, but it is located against turning. This results in the side edges of the attaching element or attaching elements being located in predetermined positions and where a series of attaching elements are used in longitudinally spaced relation, their side edges may thus be located in alignment for receiving an elongated molding.

The panel shown by Fig. 8 has circular openings indicated at 45 and where these openings are used, an attaching element may be employed which has a rounded projection indicated generally at 46. This projection is formed by making spaced and curved slits in the metal and then pressing out the projection between the slits so as to form a projection on the order of that shown by Fig. 2, with the exception being principally that the side edges of the projection are curved. Instead of using a slot, such as indicated at 32 in Fig. 2, an oval shaped opening may be employed, although if desired a longer slot, as the slot 32, may be formed in the projection and the slot would not only extend in the bottom or flat part of the projection but also partly into the end walls thereof. Since the projection and opening both are rounded, it may be preferable in this case to employ a longer attaching element having a plurality of projections. This would avoid any difficulty which might otherwise be encountered in locating the flanges in aligned relation if a series of separated attaching elements were used. Fastening of the attaching element shown by Fig. 9 to the panel shown by Fig. 8 may be effected in substantially the same manner as previously described by using a suitable tool or instrument for spreading the side portions of the projections.

It has been stated previously that the slot 32 is shorter than the projection and that this is preferable because it increases the strength at the ends of the projection. In this connection it will be seen, Fig. 2 in particular, that if the portions of the projections are spread laterally that the connection between the ends of each side portion and the base plate 13 are increased in strength by having a shorter slot 32 and therefore danger of breakage in the projections during the spreading operation is lessened. This may be of some importance particularly where operators fasten the attaching elements rapidly and through manipulation of the tool without any particular care.

In general, the attaching element may be made very inexpensively from sheet metal and by sheet metal stamping and forming operations, as will be readily understood. The side edges of the attaching element may be turned outwardly and reversely folded by suitable rolling machinery and the slits and slot may be easily formed by metal cutting operations. For example, the projection may be pressed out from the base plate 13 by suitable tool and die equipment during which the side slits are formed by shearing of the metal Shaping of the projection may be accomplished by means of the tool and die shapes and after the projection is formed, the slot 32 may be cut by means of a saw or other suitable equipment. It will be apparent to those skilled in the art that the projection may be formed in various ways. It might be added further that the attaching elements may be formed from ordinary steel such as cold rolled steel, while, on the other hand, ordinarily the molding will be fabricated from stainless steel or the like.

Although more than one form of the invention has been illustrated and described in detail, it will be apparent to those skilled in the art that various other modifications may be made without departing from the spirit of the appended claims.

What is claimed is:

1. An attaching element for molding comprising a base plate having elongated and substantially parallel spaced slits, the metal between said slits being pressed out from one side of the base to form an offset projection connected integrally at its ends to the plate, said offset projection intermediate the slits being provided with a slot extending substantially parallel to the slits whereby the metal at the sides of said slot may be spread apart transversely of the slits.

2. An attaching element for molding comprising a base plate having elongated and substantially parallel spaced slits, the metal between said slits being pressed out from one side of the base to form an offset projection connected integrally at its ends to the plate, said offset projection intermediate the slits being provided with a slot extending substantially parallel to the slits whereby the metal at the sides of said slot may be spread apart transversely of the slits, said slot being shorter than the offset portion.

3. An attaching element for molding comprising a base plate having elongated spaced slits, the metal between said slits being pressed out from one side of the base to form an offset projection having a substantial wall portion spaced from and substantially parallel to the base plate and connected at its ends to the base by end wall portions, said first wall portion having a slot intermediate the slits with the slot extending beyond the ends of such wall portion and partially into the end wall portions.

4. An attaching element for molding comprising a base plate having elongated spaced slits, the metal between said slits being pressed out from one side of the base to form an offset projection having a substantial wall portion spaced from and substantially parallel to the base plate and connected at its ends to the base by end wall portions, said projection having an intermediate opening between the two slits, and means for fastening a molding to the edges of the attaching element.

5. In combination, a supporting plate or panel having an opening, an attaching plate element on one side of the supporting plate and having spaced slits with the metal between the slits pressed out to form a projection disposed in and extending through said opening, said projection having an aperture intermediate the slits and the parts of the projection at opposite sides of the intermediate aperture being spread apart so that opposed edges of the projection engage under the edges of the supporting plate.

6. In combination a supporting plate or panel having an opening, an attaching element having a base plate on one side of the supporting plate and having spaced substantially parallel slits with the metal between the slits pressed out to form a projection disposed in and extending through said opening with a substantial portion of the projection offset from and substantially parallel to the base plate and connected at its ends to the latter, said portion of the projection having a slot intermediate the slits and substantially parallel thereto and the parts thereof at opposite sides of the slot being spread apart so that opposed edges of the projection engage under the edges of the supporting plate.

7. An attaching element for molding, comprising a base plate having elongated and substantially parallel spaced slits, the metal between said slits being pressed out from one side of the base plate to form an offset projection connected integrally at its ends to the plate, said offset projection intermediate the slits being provided with an opening and the projection being continuous and unbroken along each slit and between it and the opening whereby the metal at the sides of said opening may be transversely spread apart at the sides of the slits

WILLIAM J. HALL.